United States Patent
Oh et al.

(10) Patent No.: US 9,390,221 B2
(45) Date of Patent: Jul. 12, 2016

(54) LINEAR COMPLEXITY PRIORITIZATION OF TIMING ENGINEERING CHANGE ORDER FAILURES

(71) Applicant: Synopsys, Inc., Mountain View, CA (US)

(72) Inventors: Nahmsuk Oh, Palo Alto, CA (US); Seungwhun Paik, Sunnyvale, CA (US); Jia Wang, Sunnyvale, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/491,808

(22) Filed: Sep. 19, 2014

(65) Prior Publication Data

US 2016/0085901 A1    Mar. 24, 2016

(51) Int. Cl.
*G06F 17/50* (2006.01)
(52) U.S. Cl.
CPC .................... *G06F 17/5081* (2013.01)
(58) Field of Classification Search
CPC ............ G06F 17/5031; G06F 2217/84; G06F 17/5081
See application file for complete search history.

(56) References Cited

U.S. PATENT DOCUMENTS

| | | | | |
|---|---|---|---|---|
| 7,284,215 B1 * | 10/2007 | Kim | ..................... | G06F 17/5031 716/119 |
| 2010/0077271 A1 * | 3/2010 | Irie | ........................ | G06F 17/505 714/744 |
| 2012/0227023 A1 * | 9/2012 | Bendicksen | ......... | G06F 17/5081 716/112 |
| 2014/0149956 A1 * | 5/2014 | Fluhr | .................. | G06F 17/5031 716/113 |

OTHER PUBLICATIONS

Timing Analyzer Guide 2.1i by Xilinx, @1999.*

* cited by examiner

*Primary Examiner* — Nha Nguyen
(74) *Attorney, Agent, or Firm* — Fenwick & West LLP

(57) ABSTRACT

A system and a method are disclosed for displaying an output of a static timing analysis. A plurality of timing violations of an integrated circuit is identified. The timing violations are associated with a timing path. A reason is identified for each of the timing violations. A priority for fixing the timing violations is determined. Information describing the timing violations is sent for being presented. The information presented includes an information indicating priority associated with timing violations to assist developers in prioritizing tasks for fixing the timing violations.

16 Claims, 6 Drawing Sheets

```
Adding insertion of LibCell1 at 'D/dir1/cache1/cell_replace12_reg[0][1]/SD' to insertion list....  ⌐ 320A
(TFS == 0.848256, hold_path_count == 1, hold_slack == -0.848256, setup_slack == 4.737009)         |
Removed 1 related hold-critical pins from this iteration....                                       ┘
                                                                                                   ─ 310
```

FIG. 3A

```
Adding insertion of LibCell1 at 'DD/dir1/cache1/cell_replace12_reg[0][1]/SD' to insertion list....  ⌐ 320A
(TFS == 0.848256, hold_path_count == 1, hold_slack == -0.848256, setup_slack == 4.737009)           |
Removed 1 related hold-critical pins from this iteration....                                         ┘
Adding insertion of LibCell2_17 at 'U173/A' to insertion list....                                   ⌐ 320B
(TFS == 15.579711999999999, hold_path_count == 24, hold_slack == -0.680886, setup_slack == 0.915974)|
Setup-limited delay may be insufficient to fully fix hold violation                                  |
Removed 30 related hold-critical pins from this iteration..                                          ┘
                                                                                                     ─ 310
```

FIG. 3B

```
Adding insertion of LibCell1 at 'D/dir1/cache1/cell_replace12_reg[0][1]/SD' to insertion list....   ⌐ 320A
(TFS == 0.848256, hold_path_count == 1, hold_slack == -0.848256, setup_slack == 4.737009)           |
Removed 1 related hold-critical pins from this iteration....                                         ┘
Adding insertion of LibCell2_17 at 'U173/A' to insertion list....                                   ⌐ 320B
(TFS == 15.579711999999999, hold_path_count == 24, hold_slack == -0.680886, setup_slack == 0.915974)|
Setup-limited delay may be insufficient to fully fix hold violation                                  |
Removed 30 related hold-critical pins from this iteration..                                          ┘
Blacklisting pin 'U183/A'....                                                                       ⌐ 320C
(TFS == 1.31007, hold_path_count == 3, hold_slack == -0.852538, setup_slack == 0.436690)            |
Adding insertion of LibCell1 at 'D/lCache/cache2/cnt_replace12_reg[0][1]/SD' to insertion list....  |
Removed 1 related hold-critical pins from this iteration....                                         ┘
                                                                                                     ─ 310
```

FIG. 3C

```
                540A    Cells     Slack/Reasons    Priority
                        ─────     ─────────────    ────────
          515A ─→ S:U11            520A ～ D        P9  ～ 525A
   510A { 515B ─→  U12             520B ～ T        P7  ～ 525B
          515C ─→  U13             520C ～ T        P7  ～ 525C
          515D ─→ E:U14                            -0.5 ～ 530A
                 C:U21              D    T         P5
   510B { 540B    U22                    A         P2
                 E:U23                            -0.4
   510C {        C:U31                   W         P2
                 E:U32                            -0.3
```

LINEAR COMPLEXITY PRIORITIZATION OF TIMING ENGINEERING CHANGE ORDER FAILURES

BACKGROUND

1. Field of Art

The disclosure generally relates to the field of static timing analysis and more specifically to prioritizing timing violations identified by static timing analysis.

2. Description of the Related Art

Integrated circuit designs are simulated to assess their performance and determine whether the design works as expected. For instance a circuit design may be simulated to determine the behavior of the circuit design in response to certain input signals. Circuit designs may also be analyzed to determine whether the different stages of the circuit meet the timing requirements. For instance, a circuit design is analyzed to determine whether the propagation delay of a timing path is within the setup time and the hold time of a flip-flop connected to the end of the timing path.

At the end of the analysis of the circuit design, the analysis tools may identify multiple timing violations. The designer of the circuit reviews the results of the analysis and fixes the timing violations identified by the analysis tool. As the size and complexity of the integrated circuit increases, the number of timing violations that may be found by the analysis tool and the complexity of fixing the timing violations also increases. The process of analyzing these violations, prioritizing them, and identifying steps to fix these violations often involve manual steps. As a result, conventional techniques for processing these timing violations are often time consuming and significantly slow down the overall design process for a complex circuit.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of components of an example machine able to read instructions from a machine-readable medium and execute them in a processor (or controller).

FIGS. 3A through 3C illustrate an exemplary user interface for presenting the result of a timing analysis.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes organizing the output of a timing signoff module to reflect the priority of fixing the timing violations identified by the timing signoff module.

Multiple timing violations are identified by a static timing analyzer of the timing signoff module. Each of the identified timing violations is associated with a timing path that includes multiple cells. The timing violations are attempted to be automatically fixed. A reason why the unfixed timing violation cannot be automatically fixed is identified. The timing signoff module further determines a priority for fixing each of the plurality of unfixed timing violations.

The timing signoff module then outputs the plurality of unfixed timing violations. The timing signoff module outputs the unfixed timing violations based on their priority. A first timing violation, with a higher priority is outputted before a second timing violation with a lower priority.

Computing Machine Architecture

Figure 1:
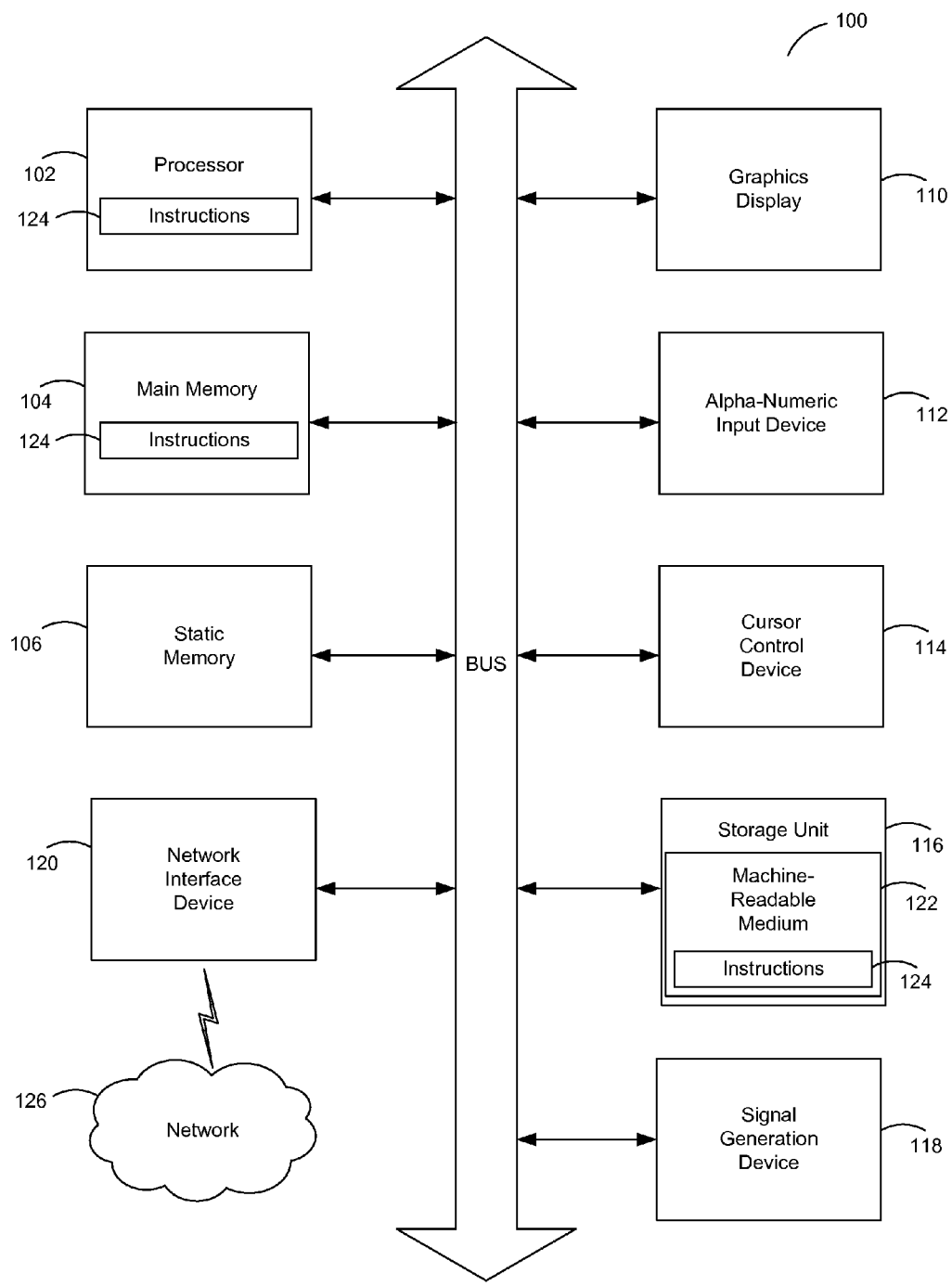

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 820, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Overview of EDA Design Flow

Figure 2A:
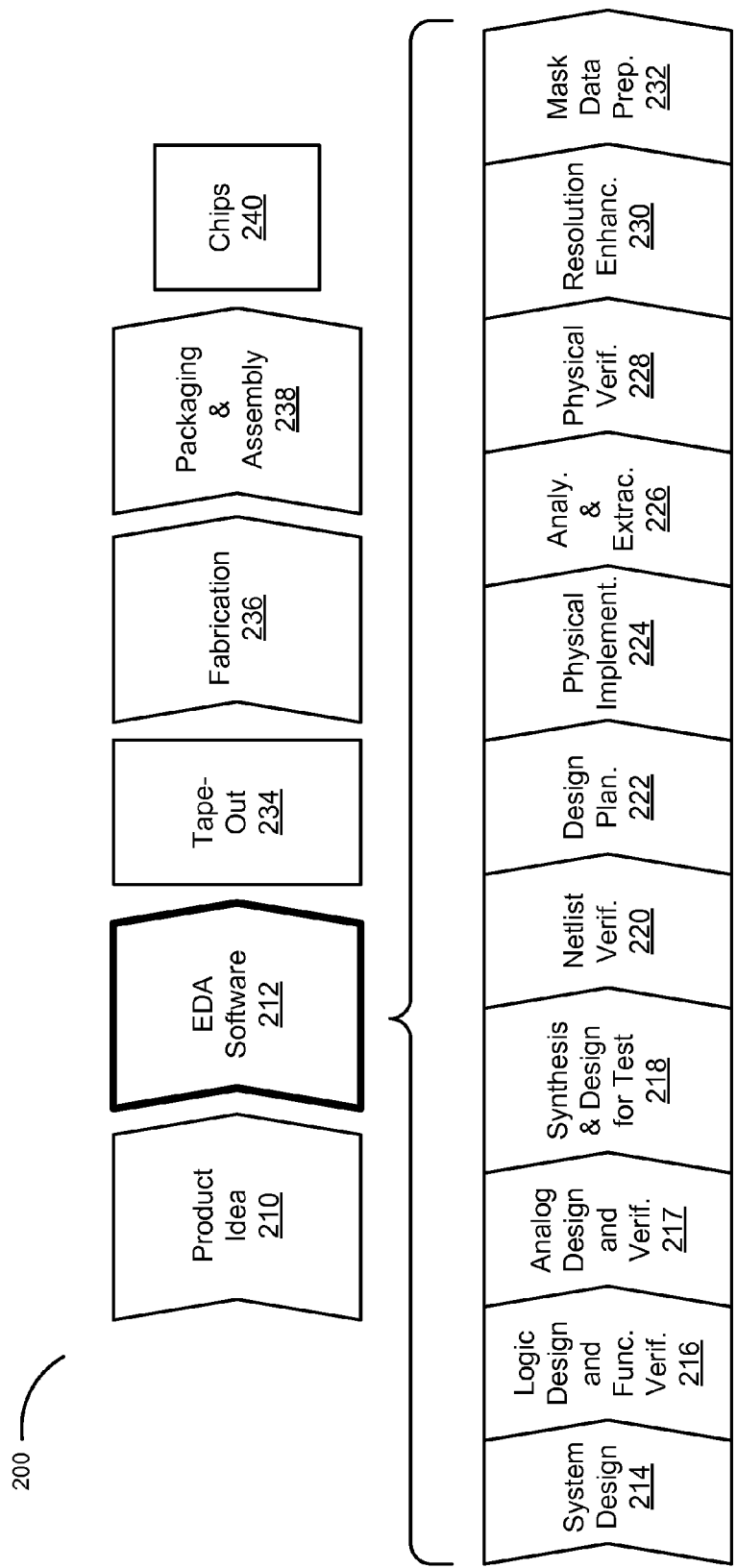
FIG. 2A is a flowchart illustrating various operations in the design and fabrication of an integrated circuit, according to one embodiment.

FIG. 2A is a flowchart 200 illustrating the various operations in the design and fabrication of an integrated circuit. This process starts with the generation of a product idea 210, which is realized during a design process that uses electronic design automation (EDA) software 212. When the design is finalized, it can be taped-out 234. After tape-out, a semiconductor die is fabricated 236 to form the various objects (e.g., gates, metal layers, vias) in the integrated circuit design. Packaging and assembly processes 238 are performed, which result in finished chips 240.

The EDA software 212 may be implemented in one or more computing devices such as the computer 100 of FIG. 1. For example, the EDA software 212 is stored as instructions in the computer-readable medium which are executed by a processor for performing operations 214-232 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 214, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 216, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During analog design, layout, and simulation 217, analog circuits are designed, layed out, and simulated to ensure both functionality and performance. Example EDA software products from Synopsys, Inc. of Mountain View, Calif. that can be used at this stage include: Custom Designer®, Hspice®, HspiceRF®, XA®, Nanosim®, HSim®, and Finesim® products.

During synthesis and design for test 218, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 220, the netlist is checked for compliance with timing constraints and for correspondence with the VHDL/Verilog source code. Example EDA software products from Synopsys, Inc. of Mountain View, Calif. that can be used at this stage include: Formality®, Primetime®, and VCS® products.

During design planning 222, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 224, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 226, the circuit function is verified at a transistor level, which permits refinement. Example EDA software products from Synopsys, Inc. of Mountain View, Calif. that can be used at this stage include: Astrorail®, Primerail®, Primetime®, and Star RC/XT® products.

During physical verification 228, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 230, geometric manipulations of the layout are performed to improve manufacturability of the design. Example EDA software products from Synopsys, Inc. of Mountain View, Calif. that can be used at this stage include: Proteus®, Proteus®AF, and PSMGED® products.

During mask-data preparation 232, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, embodiments may be used for the processes of design planning 222 and physical implementation 224.

Prioritization of Timing Violations in a Static Timing Analysis

A static timing analysis tool or static timing analyzer computes timing information for a circuit design. By using a static timing analyzer, a designer can determine whether the circuit design contains any timing violations, such as a hold time violation or a setup time violation. Static timing analyzers may determine a timing slack for the various timing paths of the circuit design. As used herein, timing slack is the difference between the target delay time of a path and the delay time of the path determined by the static timing analyzer. A positive value for the slack indicates that the circuit design does not have a timing violation, and a negative value for the slack indicates that the circuit design has a timing violation.

Figure 2B:
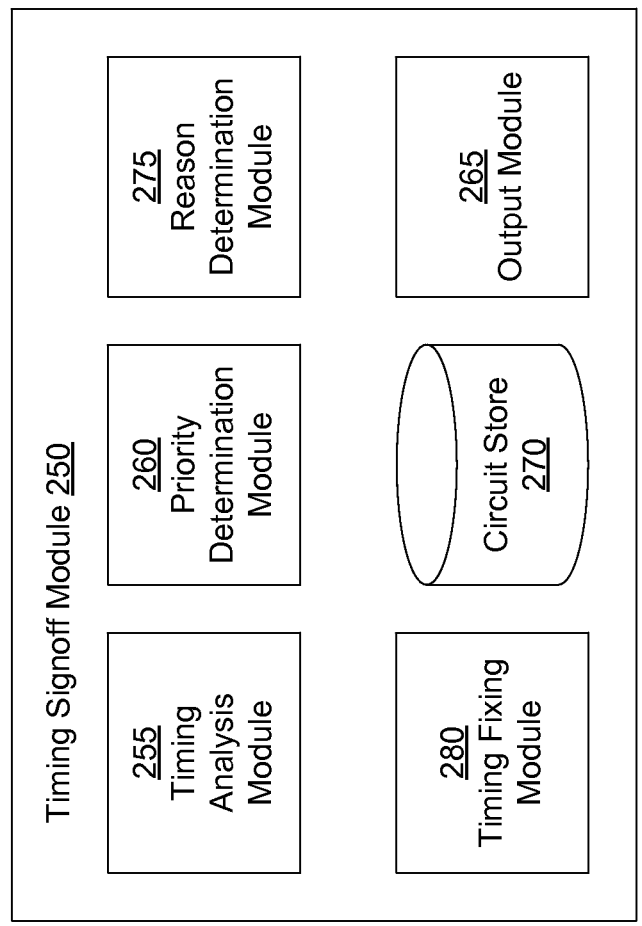
FIG. 2B is a system architecture diagram showing various modules of a timing signoff module for determining priority and reasons associated with timing violations, according to one embodiment.

FIG. 2B is a system architecture diagram showing various modules of a timing signoff module for determining priority and reasons associated with timing violations, according to one embodiment. The timing signoff module 250 comprises modules including a timing analysis module 255, a timing fixing module 280, a priority determination module 260, a reason determination module 275, a circuit store 270, and an output module 265. In other embodiments, the static timing analysis system 250 may include additional, fewer, or different modules for various applications. Conventional components such as network interfaces, security mechanisms, load balancers, failover servers, management and network operations consoles, and the like are not shown so as to not obscure the details of the system.

The circuit store 270 includes a description of the circuit being analyzed including a netlist, various constraints, and so on. The timing analysis module 255 determines timing violations that are present in the design of the integrated circuit. The timing fixing module attempts to fix the timing violations determined by the timing analysis module 255. The priority determination module 260 determines priorities for various timing violations. The reason determination module 275 determines reasons describing why a timing violation cannot be fixed automatically. The output module 265 sends information describing the timing violations, the priorities of timing violations, and reasons associated with timing violations for presentation to a user.

As the timing analysis module 255 performs the static timing analysis of a circuit design and the timing fixing module 280 attempts to fix the timing violations determined by the analysis module 255, the output module 265 outputs the results of the analysis. FIGS. 3A through 3C illustrate an exemplary user interface for presenting the result of a timing analysis. As the timing signoff module 250 analyses a circuit design, the output module 265 may print a log listing the various timing violations that were found. As new violations are found by the analyzer, the output module 265 appends information regarding the newly found violations to the log.

For instance, as illustrated in FIG. 3A, when the timing analysis module 255 determines that a path contains a timing violation, the timing signoff module prints a first output block 320A describing the found timing violation. At a later stage, the timing analysis module 255 may determine that a second path also contains a timing violation. The output module 265 then prints a second output block 320B at the end of the output log 310. The timing analysis module 255 may determine that a third path also contains a timing violation. As illustrated in FIG. 3C, the output module 265 then prints a third output block 320C describing the found timing violation for the third path. Since the timing analysis module 255 determined the timing violation for the third path after the timing violation of the first path and the timing violation of the second path, the output module 265 prints the third output block 320C after the first output block 320A and the second output block 320B.

On one hand, presenting the output of the timing analysis as show in FIGS. 3A through 3C reduces the amount of memory used by the static timing analyzed and the reduces the amount of time before the user can start seeing the results of the static timing analysis. On the other hand, when using the user interface of FIGS. 3A though 3C, a designer may not easily identify which timing violations should be fixed first, or which cells should be replaced first to fix the existing timing violations. Additionally, as the size of the circuit design increases, the number of lines outputted by the timing signoff module increases as well. Thus, increasing the complexity of finding the information the designer is looking for. Additionally, the user interface of FIGS. 3A through 3C may display a timing segment multiple times for timing segments that are shared among multiple timing paths.

Figure 4A:
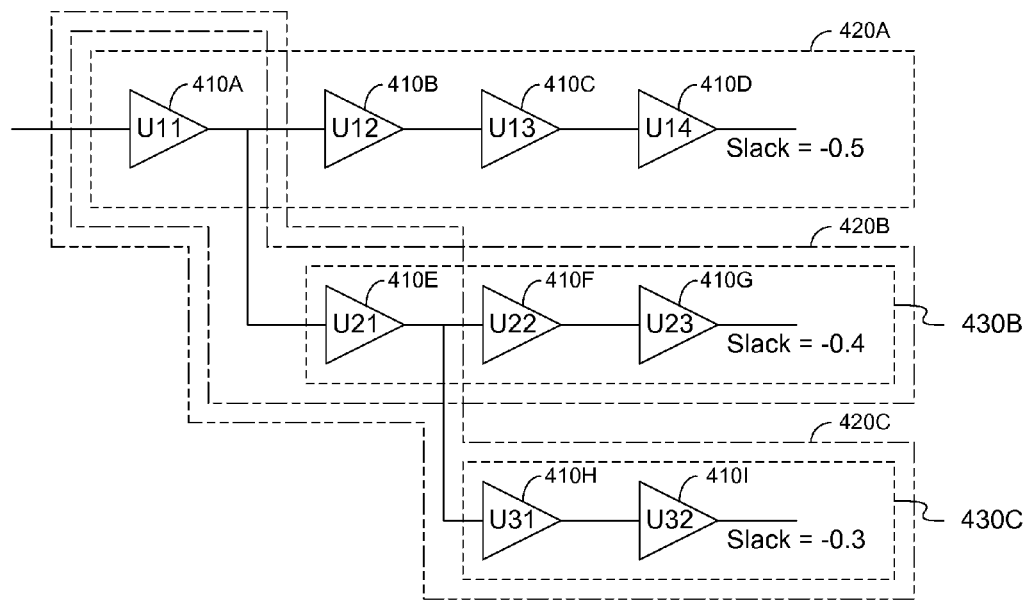
FIG. 4A illustrates a circuit diagram of an exemplary circuit 400.

FIG. 4A illustrates a circuit diagram for an exemplary circuit 400. Circuit 400 includes nine cells 410. The cells 410 of circuit 400 are arranged in three paths 420. The first path 420A includes cells 410A, 410B, 410C and 410D. The second path 420B includes cells 410A, 410E, 410F, and 410G. The third path 420C includes cells 410A, 410E, 410H, and 410I.

In the example of FIG. 4A, the timing analysis module determines that first path 420A has a slack of −0.5 ps, second path 420B has a slack of −0.4 ps, and third path 420C has a slack of −0.3 ps.

A circuit design, such as the one illustrated in FIG. 4A, can also be divided into multiple timing segments. The start node and end node of a timing path may be a storage element (e.g., a latch or a flip-flop), a port, or a user specified point or node. For instance, a first timing path may span from a first storage element to a second storage element, while a second timing path may span from a port to a third storage element. A timing segment is a portion of a timing path. That is, a timing segment may not start and/or end at a storage element. For instance, timing path 430B starts at the output of cell 410A, and includes cells 410E, 410F, and 410G. Timing path 430C starts at the output of cell 410E, and includes cells 410H and 410I.

Figure 4B:
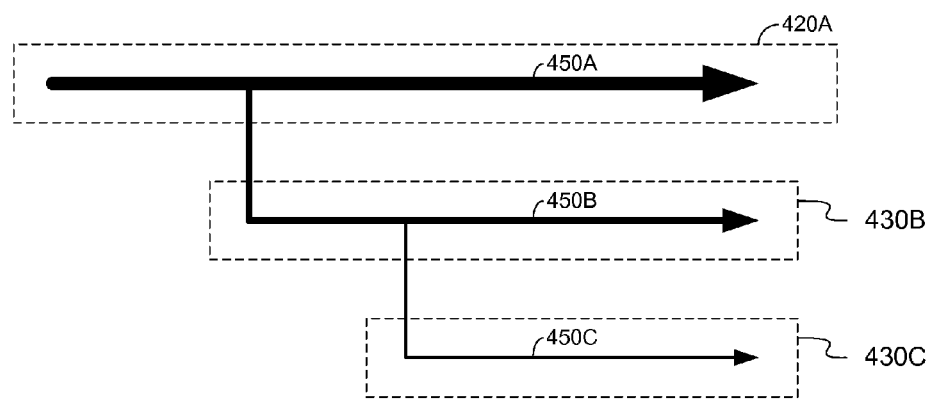
FIG. 4B illustrates a prioritization graph of the timing paths and/or timing segments of the circuit design of FIG. 4A, according to one embodiment.

FIG. 4B illustrates a prioritization graph of the timing paths and/or timing segments of the circuit design of FIG. 4A. In an embodiment, the priority determination module 260 builds the prioritization graph of the timing paths and timing segments. The prioritization graph includes three lines 450A, 450B, and 450C with different priorities, and corresponding to timing path 420A, timing segment 430B, and timing segment 430C respectively. Line 450A, represented by the thickest line, corresponds to timing path 420A of FIG. 4A. The thickest line on the priority graph indicates that the timing path or timing segment represented by the line 450A was determined as having the highest priority for being fixed. The priority determination module 260 may have determined that timing path 420A has the highest priority because timing path 420A has the slack with the largest negative number among the three timing paths 420A, 420B, and 420C of FIG. 4A.

Line 450B, represented by a line with a second thickness, thinner than the thicker line, corresponds to timing segment 430B. The line with the second thickness on the priority graph indicates that the timing path or timing segment represented by the line 450B has a priority that is lower than the priority of line 450A, represented by the thickest line.

Line 450C, represented by the thinnest line, corresponds to timing segment 430C. The thinnest line on the priority graph indicates that the timing path or timing segment represented by the line 450C has the lowest priority for being fixed. The priority determination module 260 may have determined that timing segment 430C has the lowest priority because timing segment 430C is part of timing path 420C, which has the slack with the smallest negative number among the three timing paths 430A, 430B, and 430C of FIG. 4A.

Figures 4C, 5:
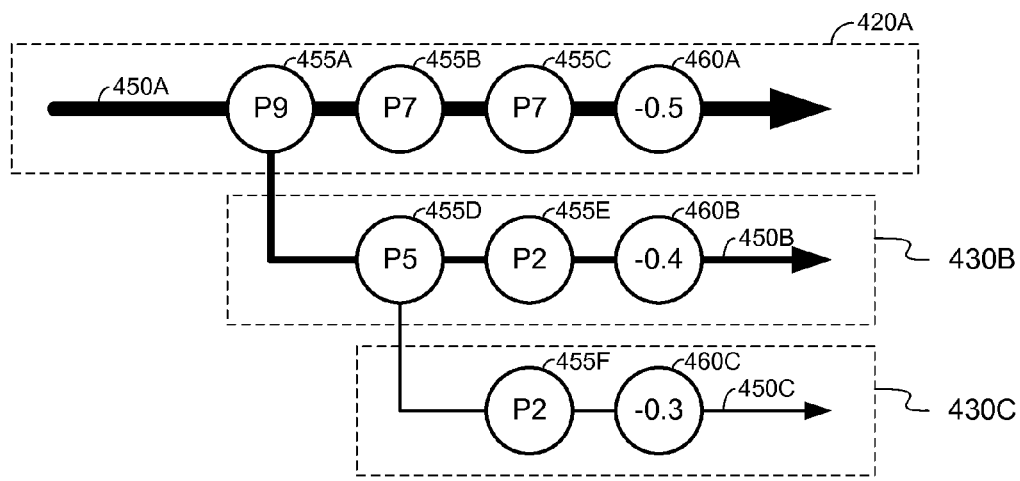
FIG. 4C illustrates a prioritization graph of the cells of the circuit design of FIG. 4A, according to one embodiment.
FIG. 5 illustrates an exemplary user interface for presenting the results of a timing analysis, according to one embodiment.

FIG. 4C illustrates a prioritization graph of the cells of the circuit design of FIG. 4A. The prioritization graph includes multiple node priorities 455. For instance, the prioritization graph of FIG. 4C includes node priority 455A corresponding to the output of cell 410A, node priority 455B corresponding to the output of cell 410B, node priority 455C corresponding to the output of cell 410C, node priority 455D corresponding to the output of cell 410E, node priority 455E corresponding to the output of cell 410F, node priority 455F corresponding to the output of cell 410H. Additionally, the prioritization graph includes timing path end 460A corresponding to the output of cell 410D, timing path end 460B corresponding to the output of cell 410G, and timing path end 460C corresponding to the output of cell 410I. Node priority 455A indicates a priority of "P9" which indicates that replacing cell 410A has a high priority. In the exemplary circuit of FIG. 4A, replacing cell 410A has a high priority because replacing cell 410A for a faster cell can potentially fix or at least alleviate the timing violations for three timing paths (timing paths 420A, 420B, and 420C). Node priorities 455B and 455C indicate a priority of "P5," node priority 455D indicate a priority of "P5," and node priorities 455E and 455F indicate a priority of "P2." Thus, in the example of FIG. 4C, cells 410B and 410C have the second highest priority, followed by cell 410E. Cells 410F and 410H have the lowest priority.

FIG. 5 illustrates an exemplary user interface for presenting the results of a timing analysis, according to one embodiment. In an embodiment, the output module 265 renders the user interface shown in FIG. 5 and sends the information for displaying for example via a client device. The interface for presenting the results of the timing analysis includes three output blocks 510A, 510B, and 510C. Each output block 510 corresponds to a timing path or a timing segment. For instance, in the exemplary user interface of FIG. 5, output block 510A corresponds to timing path 420A, output block 510B corresponds to timing segment 430B, and output block 510C corresponds to timing segment 430C.

As illustrated in FIG. 4A, timing path 420A includes four cells U11, U12, U13 and U14 and has a timing slack of −0.5 ps. Thus, output block 510A includes four output lines 515A, 515B, 515C, and 515D, corresponding to each cell in timing path 420A. In the exemplary output of FIG. 5, output line 515A corresponds to cell U11. Output line 515A also includes an indication of one or more reasons 520A why the cell cannot be automatically replaced to fix the timing violation, and a priority 525A for replacing the cell to fix the timing violation. In the example of FIG. 5, reason 520A is shown as "D." In this example, reason "D" indicates that the cell or net is located in a high density area. Thus, a faster cell that fits in high density area cannot be found. To fix this timing violation, the designer may modify a parameter in the place and route tool to decrease the density of the cells. In addition, in the example of FIG. 5, priority 525A is shown as "P9." This indicates that the replacement of this cell to fix the timing violation should be prioritized, since, as seen in FIG. 4A, changing cell U11 may also have a beneficial impact in fixing timing violations for timing paths 430B and 430C.

Output line 515B corresponds to cell U12, has a reason 520B why the cell cannot be automatically replaced of "T" and a priority 525B of "P7." In this example, reason "T" indicates that the timing margin is too tight to fix the timing violation.

Cell U11 in output line 515A has the tag 540A of "S." A tag 540 of "S" indicates that output block 510A corresponds to a timing path that starts with cell U11. Cell U14 has the tag 540B of "E." A tag 540 of "E" indicates that output line 515D corresponds to the end of a timing path or a timing segment.

Output block 510B corresponds to timing segment 430B. As illustrated in FIG. 4A, timing segment 430B includes three cells U21, U22, and U23 and has a timing slack of −0.4 ps. Thus, output block 510B includes three output lines corresponding to each cell in timing segment 430B. The output line corresponding to cell U21 has a tag of "C," indicating that start of the timing path, and the output line corresponding to cell U23 has a tag of "E," indicating the end of the timing path.

Similarly, output block 510C corresponds to timing segment 430C, which includes cells U31 and U32. Thus, output block 510C includes two output lines corresponding to each cell in timing segment 430C.

The results of the timing analysis illustrated in FIG. 5 reflect the priority for fixing the timing violations found by the timing violation module 255. For instance, timing paths with timing violations with higher priorities are outputted before timing paths with lower priorities. That is, output block 510A is associated with a timing path that has a timing violations with a higher priority than the timing path associated with output block 510B and the timing path associated with output block 510C.

In other embodiments, the output module 265 uses different techniques to indicate the priority of for fixing the timing violations. For instance, output module 265 may output a measure of the priority value along with each output block 510A, or may output blocks 510 with different priorities using a different text format, fonts, font sizes, font colors, etc.

Using the user interface of FIG. 5, designers can prioritize the order in which the timing violations are fixed. Additionally, the designers may easily identify the reasons why the timing violations were not able to be fixed automatically.

To generate the output shown in the exemplary user interface of FIG. 5, the timing violations found by the timing analysis module 255 that were not fixed by the timing fixing module 280 are stored into memory as the timing analysis module 255 finds new timing violations. When the timing signoff module finishes analyzing every timing segment, the timing violations are sorted by priority and outputted to the user.

The reason determination module 275 may identify different reasons why a cell cannot be automatically replaced to fix a timing violation. The reasons may include:

| Code | Description of Reason |
|---|---|
| A | There are available library cells outside the area limit. |
| C | The violation is in the clock network. |
| D | Cell or net is located in high density area. |
| E | Physical information is incomplete or unavailable. |
| I | Buffer insertion with given library cells cannot fix the violation. |
| L | Available physical area limits the use of one or more library cells. |
| O | No open free site is available. |
| P | Driver cell of the violation is a port. |
| Q | Driver cell of the violation is a sequential cell. |
| S | Cell sizing with alternative library cells cannot fix the violation. |
| T | Timing margin is too tight to fix the violation. |
| V | Driver cell of the violation is marked as "dont_touch." |

For instance, reason "A" may indicate that an alternative library cell for replacing a cell to fix a timing violation is available, but the area that the alternative library cell occupies is larger than an area limit. If a designer encounters this reason in an output line of a static timing analysis, the designer may be able to fix the timing violation by increasing the area limit of the design.

In another example, reason "C" may indicate that the timing violation is in the clock network. Timing violations in a clock network are usually not fixed automatically because fixing a timing violation in a clock network may create new timing violations throughout the design of the circuit.

In yet another example, reason "L" may indicate that an alternative library cell for replacing a cell to fix a timing violation is available, but the alternative library cell does not fit in the available space of the circuit design. If a designer encounters this reason in an output line of a static timing analysis, the designer may be able to fix the timing violation by using a place and route tool to increase the available physical area and replacing the cell with the alternative library cell.

The reason determination module 275 determines the reasons why a cell cannot be automatically replaced. For instance, the reason determination module 275 determines whether the cell is in a data path or a clock path. If the cell is in a clock path, the reason determination module 275 determines that the cell cannot be replaced due to reason "C."

If the cell is in a data path, the reason determination module 275 identifies an alternative library cell that would fix the timing violation. The reason determination module 275 determines an area to incorporate the alternative library cell. If the area is larger than a set area limit, the reason determination module 275 determines that the cell cannot be automatically replaced due to reason "A." If the area is larger than the available area, the reason determination module determines that the cell cannot be replaced due to reason "L."

The user interface of FIG. 5 beneficially allows designers to prioritize the timing violations to reduce the amount of time spent fixing the timing violations that were found by the timing signoff module.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for displaying an output of a timing violation fixing in a circuit design for manufacturing of an integrated circuit, the method comprising:
    determining, by an analysis tool a plurality of timing violations in the circuit design of the integrated circuit, each timing violation associated with a timing path, each timing path including a plurality of cells, the plurality of timing violations comprising a first timing violation and a second timing violation, wherein the plurality of timing violations are identified responsive to determining that the plurality of timing violations cannot be fixed by replacing one or more cells of the timing path associated with the timing violation;
    determining, for a first timing path associated with the first timing violation, a reason why one or more cells of the first timing path cannot be automatically replaced by the analysis tool;
    determining a priority for fixing, in the circuit design, each of the plurality of timing violations; and
    outputting information describing the plurality of timing violations, the outputting comprising:
        outputting information for the first timing violation and information for the second timing violation, and an indication of the priority of the first timing violation compared to the priority of the second timing violation, and
        outputting an indication of the reason why the one or more cells of the first timing path associated with the first timing violation cannot be automatically replaced by the analysis tool.

2. The method of claim 1, wherein the indication of the priority of the first timing violation compared to the priority of the second timing violation comprises outputting the second timing violation after the first timing violation.

3. The method of claim 1, wherein the indication of the priority of the first timing violation compared to the priority of the second timing violation comprises providing a measure of the priority value along with the output for each timing violation.

4. The method of claim 1, wherein the indication of the priority of the first timing violation compared to the priority of the second timing violation comprises outputting the second timing violation using a text different from the text used for outputting the first timing violation.

5. The method of claim 1, wherein the indication of the priority of the first timing violation compared to the priority of the second timing violation comprises outputting the second timing violation using a color different from the color used for outputting the first timing violation.

6. The method of claim 1, wherein outputting information for the first timing violation comprises:
    outputting information of cells of the first timing path, the information including a reason why the timing violation cannot be automatically fixed and a priority for fixing the timing violation.

7. The method of claim 1, wherein the timing violations cannot be automatically fixed because cells included in the timing paths associated with the plurality of timing violations cannot be automatically replaced, and further comprising:
    determining a priority for replacing each cell of the plurality of cells of each timing path.

8. The method of claim 7, wherein a reason why a cell cannot be automatically replaced includes at least one of: the cell is in a clock network or the cell is located in a high density area.

9. The method of claim 1, wherein a reason why a cell cannot be automatically replaced includes at least one of a replacement cell exceeds an area limit, available physical area limits a use of one or more library cells.

10. The method of claim 1, wherein a reason why a cell cannot be automatically replaced includes at least one of: non-availability of physical information for the cell or buffer insertion with library cells cannot fix the timing violation.

11. The method of claim 1, wherein determining a priority for fixing each of the plurality of timing violations comprises:
    determining a slack value for each of the plurality of timing violations; and
    determining the priority for fixing each of the plurality of timing violations based on the determined slack values.

12. The method of claim 11, wherein determining the priority for fixing each of the plurality of timing violations comprises:
    determining that the first timing violation has higher priority than the second timing violation responsive to determining that the slack value for the first timing violation is greater than the slack value of the second timing violation.

13. A system for performing static timing analysis of an integrated circuit design for manufacturing of an integrated circuit, the system comprising:
    a processor; and a non-transitory computer readable medium storing instruction, the instructions when executed by the processor cause the processor to:
  determine a plurality of timing violations of the integrated circuit design, each timing violation associated with a timing path, each timing path including a plurality of cells, the plurality of timing violations comprising a first timing violation and a second timing violation, wherein the plurality of timing violations are identified responsive to determining that the plurality of timing violations cannot be fixed by replacing one or more cells of the timing path associated with the timing violation;
  determine, for a first timing path associated with the first timing violation, a reason why one or more cells of the first timing path cannot be automatically replaced by an analysis tool;
  determine a priority for fixing, in the integrated circuit design, each of the plurality of timing violations; and
  output information describing the plurality of timing violations, the outputting comprising:
    outputting information for the first timing violation and information for the second timing violation, and an indication of the priority of the first timing violation compared to the priority of the second timing violation, and
    output an indication of the reason why the one or more cells of the first timing path associated with the first timing violation cannot be automatically replaced by the analysis tool.

14. The system of claim 13, wherein the indication of the priority of the first timing violation compared to the priority of the second timing violation comprises outputting the second timing violation after the first timing violation.

15. A non-transitory computer readable medium configured to store instructions, the instructions when executed by a processor cause the processor to:
  determine a plurality of timing violations of an integrated circuit design, each timing violation associated with a timing path, each timing path including a plurality of cells, the plurality of timing violations comprising a first timing violation and a second timing violation, wherein the plurality of timing violations are identified responsive to determining that the plurality of timing violations cannot be fixed by replacing one or more cells of the timing path associated with the timing violation;
  determine, for a first timing path associated with the first timing violation, a reason why one or more cells of the first timing path cannot be automatically replaced by an analysis tool;
  determine a priority for fixing, in the integrated circuit design, each of the plurality of timing violations; and
  output information describing the plurality of timing violations, the outputting comprising:
    outputting information for the first timing violation and information for the second timing violation, and an indication of the priority of the first timing violation compared to the priority of the second timing violation, and
    output an indication of the reason why the one or more cells of the first timing path associated with the first timing violation cannot be automatically replaced by the analysis tool.

16. The non-transitory computer readable medium of claim 15, wherein the indication of the priority of the first timing violation compared to the priority of the second timing violation comprises outputting the second timing violation after the first timing violation.

* * * * *